United States Patent
Leontaris et al.

(10) Patent No.: US 8,908,758 B2
(45) Date of Patent: Dec. 9, 2014

(54) HIGH PERFORMANCE RATE CONTROL FOR MULTI-LAYERED VIDEO CODING APPLICATIONS

(75) Inventors: Athanasios Leontaris, Mountain View, CA (US); Alexandros Tourapis, Milpitas, CA (US)

(73) Assignee: Dolby Laboratories Licensing Corporation, San Francsico, CA (US)

( * ) Notice: Subject to any disclaimer, the term of this patent is extended or adjusted under 35 U.S.C. 154(b) by 366 days.

(21) Appl. No.: 13/520,893

(22) PCT Filed: Jan. 3, 2011

(86) PCT No.: PCT/US2011/020033
§ 371 (c)(1),
(2), (4) Date: Jul. 6, 2012

(87) PCT Pub. No.: WO2011/084918
PCT Pub. Date: Jul. 14, 2011

(65) Prior Publication Data
US 2013/0028316 A1 Jan. 31, 2013

Related U.S. Application Data

(60) Provisional application No. 61/292,700, filed on Jan. 6, 2010, provisional application No. 61/292,711, filed on Jan. 6, 2010.

(51) Int. Cl.
*H04N 7/26* (2006.01)
*H04N 19/187* (2014.01)
(Continued)

(52) U.S. Cl.
CPC ... *H04N 19/00321* (2013.01); *H04N 19/00769* (2013.01); *H04N 19/00351* (2013.01); *H04N 19/00357* (2013.01); *H04N 19/00175* (2013.01); *H04N 19/00781* (2013.01); *H04N 19/0006* (2013.01); *H04N 19/0009* (2013.01); *H04N 19/00187* (2013.01); *H04N 19/00424* (2013.01)
USPC ............ 375/240.01; 375/240.02; 375/240.03; 375/240.26

(58) Field of Classification Search
CPC .................. H04N 19/00781; H04N 19/00321; H04N 19/00442; H04N 21/234327; H04N 19/00751; H04N 19/00424; H04N 19/00436; H04N 19/00448; H04N 19/00175; H04N 19/0043; H04N 19/00418; H04N 7/26297; H04N 7/26696; H04N 7/02
USPC ........................................ 375/240.01–240.29
See application file for complete search history.

(56) References Cited

U.S. PATENT DOCUMENTS

| | | | |
|---|---|---|---|
| 2007/0116126 A1* | 5/2007 | Haskell et al. | 375/240.21 |
| 2007/0165717 A1* | 7/2007 | Ye | 375/240.16 |

(Continued)

FOREIGN PATENT DOCUMENTS

| | | |
|---|---|---|
| WO | 2006004605 | 1/2006 |
| WO | 2006119436 | 11/2006 |
| WO | 2009045683 | 4/2009 |
| WO | 2011/084916 | 7/2011 |

OTHER PUBLICATIONS

ITU "Advanced Video Coding for Generic Audiovisual Services" Oct. 2009.

(Continued)

*Primary Examiner* — Sath V Perungavoor
*Assistant Examiner* — Nathnael Aynalem

(57) ABSTRACT

Methods and systems for multi-layer video encoding are described. In the system, an inter-layer analysis module gathers and analyzes inter-layer coding statistics, so that a rate control module can perform rate control on the various layers based on the statistics.

37 Claims, 8 Drawing Sheets

(51) Int. Cl.
*H04N 19/597* (2014.01)
*H04N 19/19* (2014.01)
*H04N 19/192* (2014.01)
*H04N 19/147* (2014.01)
*H04N 19/61* (2014.01)
*H04N 19/115* (2014.01)
*H04N 19/124* (2014.01)
*H04N 19/15* (2014.01)
*H04N 19/30* (2014.01)

(56) References Cited

U.S. PATENT DOCUMENTS

| | | | |
|---|---|---|---|
| 2008/0144723 A1* | 6/2008 | Chen et al. | 375/240.26 |
| 2009/0086816 A1 | 4/2009 | Leontaris et al. | |
| 2011/0090960 A1 | 4/2011 | Leontaris et al. | |
| 2012/0092452 A1 | 4/2012 | Tourapis et al. | |

OTHER PUBLICATIONS

Liu, Y. et al., "Rate Control of H264/AVC Scalable Extension" IEEE Transactions on Circuits and Systems for Video Technology, vol. 18, No. 1, Jan. 2008.

Yan, T. et al., "Basic Unit Layer Rate Control for MVC" JVT Meeting of ISO/IEC MPEG & ITU-T VCEG, 32nd meeting: Geneva, Switzerland, Nov. 2-4, 2009.

Schwarz, H. et al., "Overview of the Scalable Video Coding Extension of the H264/AVC Standard" IEEE Transactions on Circuits and Systems for Video Technology, vol. 17, No. 9, Sep. 2007, pp. 1103-1120.

Reichel, J. et al., "Joint Scalable Video Model JSVM-12 Text" JVT of ISO/IEC MPEG & ITU-T VCEG, 25th meeting: Shenzhen, CN, Oct. 21-26, 2007.

Schwarz, H. et al., "R-D Optimized Multi-Layer Encoder Control for SVC" Image Processing, 2007, IEEE International Conference on IEEE, Sep. 1, 2007, pp. II-281.

* cited by examiner

HIGH PERFORMANCE RATE CONTROL FOR MULTI-LAYERED VIDEO CODING APPLICATIONS

CROSS REFERENCE TO RELATED APPLICATIONS

This application represents the national stage entry of PCT Application Ser. No. PCT/US2011/020033, filed on Jan. 3, 2011, which claims priority to U.S. Patent Provisional Applications Nos. 61/292,711, filed on Jan. 6, 2010, and 61/292,700, filed on Jan. 6, 2010, both hereby incorporated by reference in their entirety.

BACKGROUND

Rate control is a component that performs a critical function in a modern video encoder. It ensures that the generated compressed bit stream (a) achieves the bit rate target, (b) satisfies maximum average bit rate constraints, and (c) satisfies hypothetical reference decoder (buffering delay) constraints, among others. An optional, but highly desirable, objective is to optimize the video quality of the compressed video bitstream.

Satisfying constraint (a) ensures that the compressed video bitstream will fit the communication pipe or storage space. For example, a wireless network may only allow up to 768 kbps for video transmission. This is in contrast to, say, a Blu-Ray disc, which may allow up to 40 Mbps of video bandwidth for 2D applications and 60 Mbps for 3D applications. In addition, for archival applications or applications where bandwidth can be extremely high (such as reading from a hard drive) one may only specify the total size of the final bitstream file. Constraint (b) also deserves attention, since playback devices can only store and decode a certain number of bits per second. It is possible that during the encoding process one may have the situation where the average bit rate for the entire compressed bitstream achieves the bit rate target, but the average bit rate exceeds it locally, for example for a duration of some seconds. Often this can happen because difficult-to-code areas usually require more bits to ensure consistent or better video quality. However, these bitstream "spikes", provided they are large enough, can create problems for resource-constrained decoders. Problems that may affect a decoder include either overflowing of internal buffers or the inability to decode the bitstream in time to display the frames in the correct order and with proper timing. Last, constraint (c) is closely related to constraint (b) and can be thought of as a more rigorous set of requirements that a bitstream has to satisfy. In short, the compressed bitstream has to be coded such that if transmitted at the target bit rate it will never cause a decoder buffer overflow or underflow, and as a result, the decoded video will never stall or stop during playback.

Rate control is also tasked with ensuring the best possible video quality given the above bit rate and buffering constraints.

A video sequence may be coded in a single coding pass. This may be due to computational or time constraints, or due to the nature of the content: the content is being streamed live and the fixed delay from capture to delivery to the consumer may only allow a small lookahead into the future. If these constraints are relaxed, one may wish to do more than one coding passes to compress the video sequence. In such a case, rate control benefits from information drawn from previous coding passes. This information, for example, may include a measure of the complexity, such as the number of header and texture bits generated for the given frame type and the quantization parameter (QP), or the temporal correlation of frames in the image sequence, among others, and can improve both bit rate accuracy and help satisfy the bit rate and buffering constraints. Header bits include bits used to code motion information, coding modes, block types, parameter sets, and also information that is not essential to the decoding process such as video usability descriptors. Texture bits include bits used to code the transformed coefficients of the inter or intra prediction residuals. Usually the latter number of bits forms the bulk of the coded bitstream especially for high bit rates.

Furthermore, the information drawn from previous coding passes can greatly improve the quality of the compressed video bitstream. The reason is the availability of coding statistics for the entire video sequence. Such knowledge enables one to efficiently spend bits in the video sequence segments where they will do the most good (as usually measured in terms of rate-distortion performance). It is well known that spending more bits in difficult-to-code areas (high motion scenes, scenes with lots of texture, fades, scene changes, flashes, etc.) as compared to, say, static scenes, will improve quality overall, both subjectively and objectively. In general, the more coding passes, the better the video quality that can be achieved given some fixed bit rate budget. However, there will always be some point of diminishing returns, where the return on coding gain will be trivial compared to the added computational expense.

The traditional rate control paradigm has been applied for the coding of single-layer video bitstreams. A single-layer bitstream corresponding to a single frame needs to be parsed and decoded in its entirety in order to reconstruct the frame. Such bitstreams are created when conforming to Annex H of the H.264/MPEG-4 Part 10 AVC video coding standard. See reference 1, incorporated herein by reference in its entirety.

DESCRIPTION OF EXAMPLE EMBODIMENTS

Figure 1:
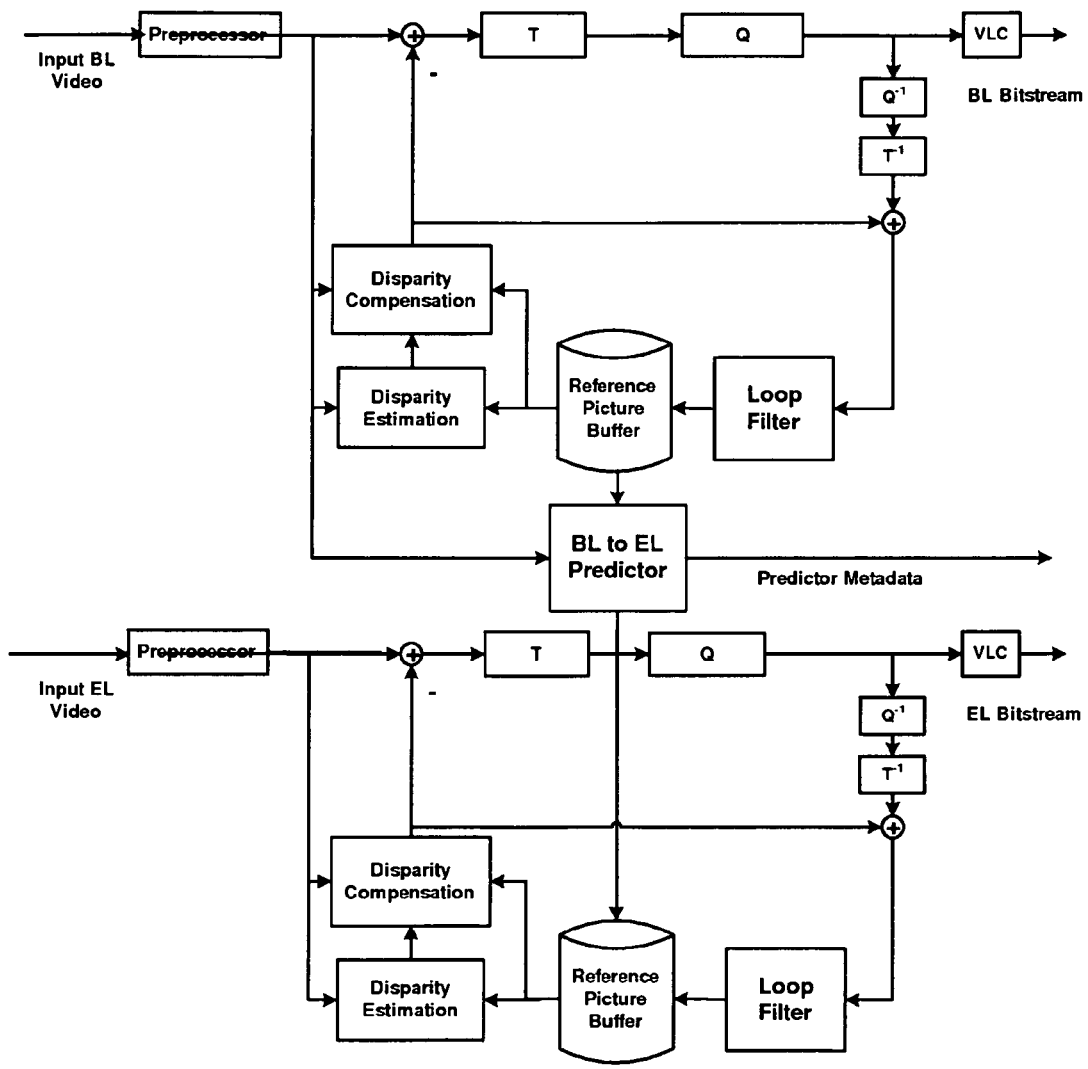
FIG. 1 shows a generic scalable video coding system.

According to a first embodiment, a multi-layer video encoding system is provided, comprising: a base layer encoder to provide a base layer encoded bitstream of a video input; one or more enhancement layer encoders to provide corresponding one or more enhancement layer encoded bitstreams of the video input; an inter-layer analysis module to gather and analyze coding statistics from one or more of the base layer encoder and one or more enhancement layer encoders; and at least one rate control module to perform rate control on one or more of the base layer encoder and one or more enhancement layer encoders based on the inter-layer analysis module.

According to a second embodiment, a method to encode a video signal is provided, comprising: base layer encoding the video signal to provide a base layer encoded bitstream; enhancement layer encoding the video signal to provide one or more enhancement layer encoded bitstreams; gathering and analyzing coding statistics from the base layer encoding and/or enhancement layer encoding to provide inter-layer relationships; and performing rate control on the base layer encoding and/or enhancement layer encoding based on the inter-layer relationships.

According to a third embodiment, a multiple-pass rate control method for multi-layer video coding applications comprising a base layer and one or more enhancement layers is provided, comprising: performing a first coding pass on the base layer; gathering coding statistics of the first coding pass; performing intermediate coding passes on one or more of the base layer and one or more enhancement layers; gathering coding statistics of the intermediate coding passes; estimating relationships between the layers based on the first coding pass and the intermediate coding passes; and performing a final coding pass based on the gathered coding statistics and the estimated relationships.

According to a fourth embodiment, a multiple-pass rate control method for multi-layer video coding applications comprising a base layer and one or more enhancement layers is provided, comprising: performing a first coding pass on the base layer and the one or more enhancement layers, wherein quantization parameters used for the base layer are at a fixed offset from the quantization parameters of each of the one or more enhancement layers; gathering coding statistics for the base layer and the one or more enhancement layers; performing intermediate coding passes on one or more of the base layer and one or more enhancement layers; gathering coding statistics of the intermediate coding passes; and performing a final coding pass based on the gathered coding statistics to satisfy target bit rate and fixed quantization parameter constraints.

According to a fifth embodiment, a multiple-pass rate control method for multi-layer video coding applications comprising a base layer and one or more enhancement layers is provided, comprising: performing a first coding pass on the base layer; gathering coding statistics for the base layer; performing intermediate coding passes on one or more of the base layer and the one or more enhancement layers, wherein, when coding is performed on an enhancement layer, quantization parameters used for the base layer are at an offset from the quantization parameters of the enhancement layer; gathering coding statistics of the intermediate coding passes; estimating relationships between the layers based on the first coding pass and the intermediate coding passes; and performing a final coding pass based on the gathered coding statistics and the estimated relationships to satisfy target bit rate and fixed quantization parameter constraints.

According to a sixth embodiment, a rate control method for multi-layer video coding applications comprising a base layer and one or more enhancement layers is provided, comprising: coding the one or more enhancement layers with coding parameters that are selected to obtain a desired bit rate ratio constraint; if the desired bit rate ration constraint is not obtained, updating the coding parameters; and coding again the one or more enhancement layers until the desired bit rate ratio constraint is obtained.

According to a seventh embodiment, a multiple-pass rate control method for multi-layer video coding applications comprising a base layer and one or more enhancement layers is provided, comprising: performing a first coding pass on the base layer and the one or more enhancement layers, wherein quantization parameters used for the base layer are at a fixed offset from the quantization parameters of each of the one or more enhancement layers; gathering coding statistics for the base layer and the one or more enhancement layers; performing intermediate coding passes on one or more of the base layer and one or more enhancement layers; gathering coding statistics of the intermediate coding passes; and performing a final coding pass based on the gathered coding statistics, wherein quantization parameters and bit allocation for each quantization parameter constraint are selected so that a fixed offset constraint and an overall base and enhancement layer bit target are satisfied.

Further embodiments of the disclosure are provided in the specification, drawings and claims of the present application.

Multi-layer or scalable bitstreams are composed of multiple layers that are characterized by pre-defined dependency relationships. One of those layers is a so-called base layer (BL) that needs to be decoded prior to any other layer. The rest of the layers are usually known as enhancement layers (EL) since their function is to improve the content as provided when just the base layer is parsed and decoded. These are also dependent layers in that they all require the base layer, and often one or more of them may also be dependent on the decoding of other higher priority enhancement layers. Reference can be made, for example, to the diagrams shown in FIGS. 1 and 3.

Multi-layer or scalable bitstreams enable scalability in terms of quality/SNR, spatial, and temporal scalability, and even availability of additional views. The first two paradigms are possible when adopting the Scalable Video Coding (SVC) extension (Annex G) of the H.264/MPEG-4 Part 10 AVC video coding standard. For example, the base layer provides a coarse quality version of the image sequence, while the enhancement layer or layers may provide additional increments in terms of visual quality. Similarly, the base layer may provide a low resolution version of the image sequence. The resolution may be improved by decoding additional enhancement layers. Temporal scalability is available with the basic mode (Annex A) of H.264/MPEG-4 AVC through the coding of disposable pictures. In such a scenario, the base layer may provide a version of the image sequence at say 15 frames per second, which can be improved to say 30 frames per second by decoding the temporal enhancement layer. Scalable or multi-layer bitstreams are also useful for providing multi-view scalability. One such application is stereoscopic 3D video that consists of two views, one for the left and a second for the right eye. Two layers may be used, a base for one view and an enhancement layer for the second view. See, for example, FIG. 2.

Recently, there has been considerable interest and traction in the industry towards stereoscopic (3D) video delivery. The Multi View Coding (MVC) extension (Annex H) of the H.264/MPEG-4 Part 10 AVC video coding standard [see reference 1 incorporated herein by reference in its entirety] will be deployed in the next generation of Blu-Ray discs that feature stereoscopic 3D content. The MVC extension utilizes an H.264/AVC-compatible base layer that compresses one of the views (usually the left) and an enhancement layer that compresses the other view.

While the base layer is on its own a valid Annex A H.264/AVC bitstream and is independently decodable from the enhancement layer, the same is not true for the enhancement layer. The enhancement can utilize as references decoded frames from the base layer. As a result, it benefits from inter-view prediction and compression may improve considerably for scenes with high inter-view correlation or low stereo disparity. The teachings of the present disclosure can be applied to such prediction paradigm. Similarly, U.S. Provisional Patent Application No. 61/223,027, incorporated herein by reference in its entirety, features a base and an enhancement layer. In contrast to the MVC approach, the views may be multiplexed into both layers in order to provide consumers with a base layer that is frame compatible by carrying sub-sampled versions of both views. Furthermore, an additional pre-processing stage may be present that predicts the enhancement layer frame given the base layer decoded frame prior to using it as a motion-compensated reference for prediction of the enhancement layer. See, for example, FIG. 4. The teachings of the present disclosure can be applied to this coding paradigm as well.

Embodiments of the present disclosure are directed to techniques and methods for efficient rate control for multi-layer coding applications that feature a base and one or more enhancement (dependent) layers.

Rate control is often performed by maintaining, updating, and using a rate control model. A rate control model may yield the bits required to code a frame given certain coding parameters or may yield the coding parameters required to code the frame with the allocated number of bits.

Coding parameters include but are not limited to the type of frame coding (I, P or B), the quantization parameter (QP), which may be provided on a frame or a block/region level, the Lagrangian multipliers that are used during rate-distortion optimized motion estimation and mode decision, the availability or not of such features as trellis-optimized quantization, coefficient thresholding, weighted prediction, the availability of coding modes and block types, among others. All of the above are factors that impact rate-distortion performance.

A rate control model takes into account some subset of the above factors, some image statistics (such as variance or entropy) and connects them with the bit rate usage, often the texture bit rate usage. A highly popular model is the so-called quadratic rate control model that is formulated as:

$$t + h = c_1 \times \frac{\sigma}{Q} + c_2 \times \frac{\sigma^2}{Q^2}.$$

Terms t and h denote texture and header bits, while σ denotes source variance and Q denotes the quantization step size (has an one-to-one relationship with the QP). Terms $c_1$ and $c_2$ are model parameters.

In a multi-layered video coding system, a rate control model may model an individual layer or multiple layers: for the former the number of bits required to code the given layer is estimated given the coding parameters of the layer, and equivalently the coding parameters are determined so as to code the given layer with the allocated number of bits. For the latter (joint model) the number of bits required to code the given layer is estimated given the coding parameters of the given layer and the layers (base and enhancement) on which it depends. Similarly, given the number of allocated bits, the rate control models may estimate the coding parameters for the given layer and the layers upon which it depends (the higher priority layers). More often, one may already constrain the coding parameters selected for the higher priority layers to ease the computation burden since otherwise there may be countless possible solutions. It should be noted that bits spent on lower priority (enhancement) layers implicitly affect higher priority layers such as the base layer. Since enhancement layers depend on the base layer, more or fewer bits spent on the base layer do not only affect the quality of that layer but through inter-layer prediction this increased or decreased quality may also propagate on to the enhancement layers. Hence it is not always clear cut where the additional bits will do the most good.

Figure 5:
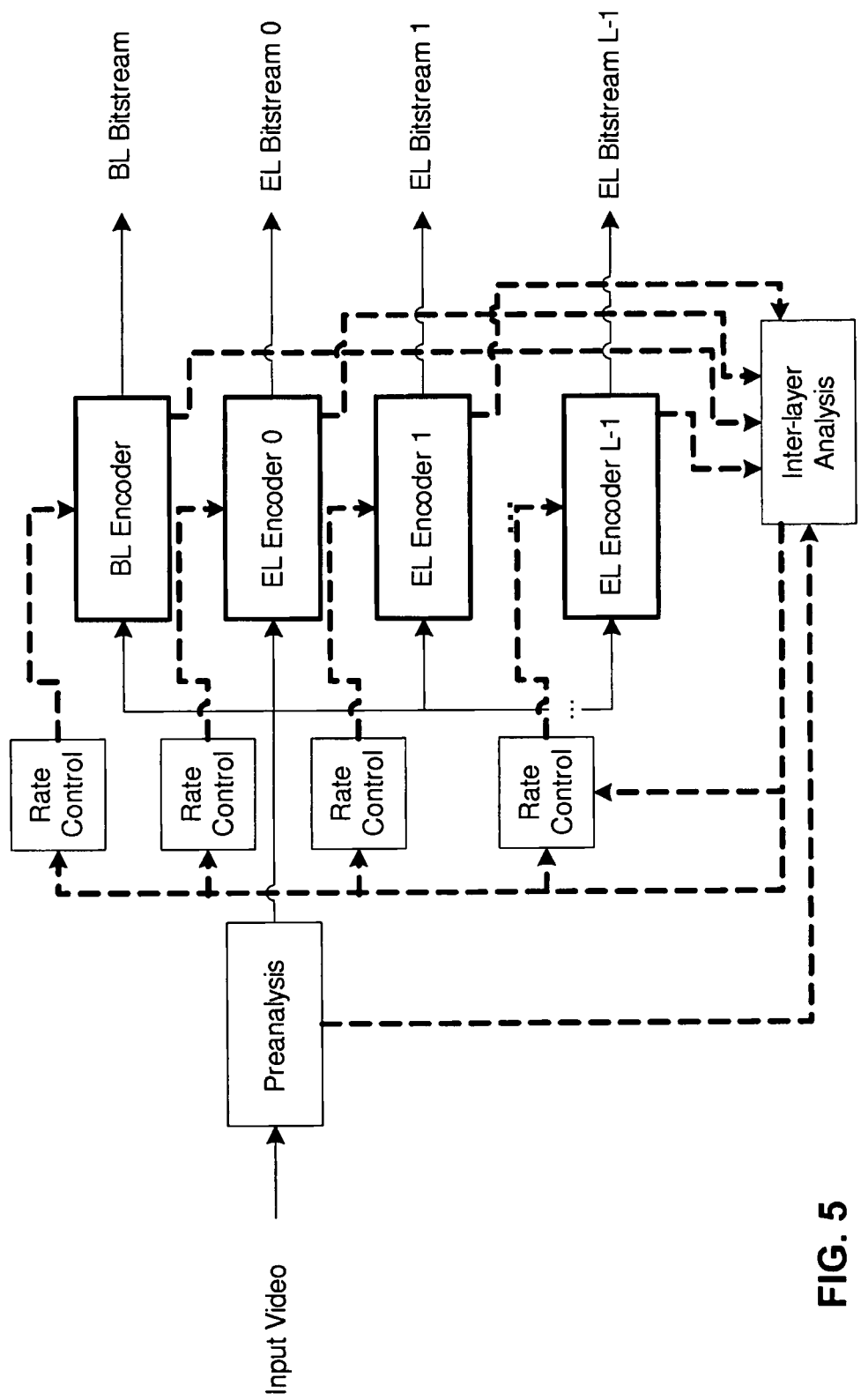
FIG. 5 shows a diagram of rate control for multi-layered coding systems that benefits from inter-layer relationship information.

FIG. 5 shows a high-level diagram of the teachings of the present disclosure according to several embodiments of the same. As shown in FIG. 5, a multi-layer encoding system comprises a base layer (BL) encoder and one or more enhancement layer (EL) encoders 0, 1, . . . , L-1. Rate control can be performed on each encoder. The extent of rate control and which are the encoders interested by rate control can depend by inter-layer analysis which, in turn, depends on information and/or statistics generated by previous encoding passes, when multi-pass coding is performed, or statistics generated by previously coded higher priority layers. For example, statistics from the BL can be used to affect and improve rate control for one or more of the Els. If desired, inter-layer analysis can also depend on information gathered from a pre-analysis module.

Coding statistics include picture or slice coding type (such as I, P or B), bit usage per category (such as texture, header, and motion), coding mode statistics (e.g. how many skip or intra coding modes), block type statistics, spatial statistics such as variance, histograms, coding parameters (QP and Lagrangian lambda used), coding tool settings (indicating which of them were enabled), motion vector information, motion-compensated and intra prediction errors, weighted prediction parameters, frame and block level distortion, frame classifications (e.g. scene change), among others.

Inter-layer analysis involves gathering information through some previous coding pass (or previously coded layer) or through some pre-analysis stage like the one shown in FIG. 5. The pre-analysis stage may consider spatial or motion-compensated analysis methods. The analysis may be performed in a spatially or temporally sub-sampled version of the original image sequence. Furthermore, for multi-view applications, the analysis may only consider a subset of the total number of views. Spatial features such as conditional entropy, variance, edges, and luminance and/or chrominance histograms may be used to establish similarity across the layers (or views). Motion information and motion model prediction errors, which may be obtained through motion estimation and compensation, may be used to determine stereo disparity and in general correlation across different layers. Segmentation accompanied with motion/stereo disparity (in the case of view scalability) analysis can also be used to estimate the correlation across the layers.

Figure 6:
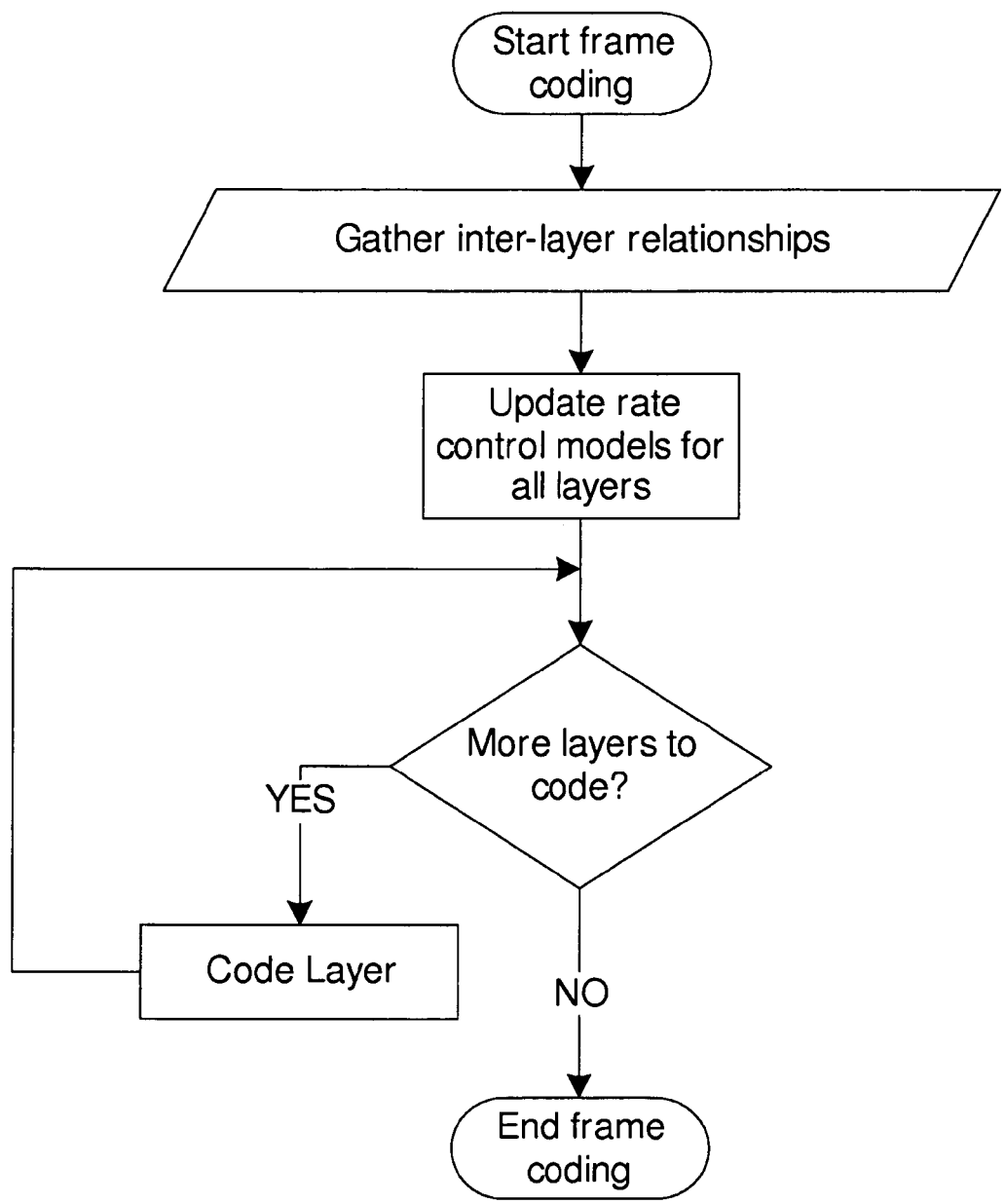
FIG. 6 shows a basic flow chart where rate control with inter-layer considerations is performed.

As shown in the flowchart of FIG. 6, the characteristics of the base layer and its relationships to the enhancement layers can be considered in order to adjust the rate control model, either as a joint model or as multiple individual models. As already mentioned before, in the individual model, the number of bits and/or coding parameters for a chosen layer are controlled on the basis of statistics and/or analysis for that layer. In the joint model, the number of bits and/or coding parameters for a chosen layer are controlled on the basis of statistics and/or analysis for multiple layers.

Use of an individual model does not preclude that such model can be improved and updated by also considering statistics from other layers. By way of example, the simple individual model case bits_EL=a×QP_EL can be considered. Although the model parameter a depends only on EL parameters (QP_EL), such parameter can be updated using knowledge from other previously coded layers. On the other hand, an example of joint model is, for example, bits_EL=a×QP_EL+b×QP_BL.

Coding statistics are gathered for the base layer, and for the enhancement layers conditioned on the layers upon which they depend for decoding. Additional information can also be available through the pre-analysis stage. Furthermore, the inter-layer relationships can also be calculated and retained. These relationships can also be used to update the individual rate control models or the joint rate control model as also shown in the flowchart of FIG. 6. In the individual model case, in some embodiments, the number of models M may be fewer than the number of the layers L. This is possible by translating coding parameters or bit estimates from one layer to the other after maintaining and building translation models similar to the techniques described in U.S. Provisional Patent Application No. 61/061,941, incorporated herein by reference in its entirety. In particular, a translation model is a function, formula or method that translates coding parameters or bit usage from one coding type to another (e.g., from P to I frames). In the present case, these models can be used to translate from one layer to another. It is also possible to employ more rate control models than the actual number of layers. This is possible using, for example, methods outlined in US Published Application 2009-0086816, incorporated herein by reference in its entirety. This may be advantageous in cases where due to rapid changes in the content it may be difficult for a single rate control model to perform well.

Inter-layer relationships may include conditioning the bit estimates on coding parameters of layers that affect the current enhancement or base layer. In one embodiment, these relationships consider QP values of both the base and the enhancement layers in order to derive bit estimates for the enhancement layer. Similarly, given a bit estimate and the coding parameters of one of the layers one can derive the coding parameters for the other layer. These relationships or models may be built by processing causal statistics or previous coding or processing passes. In embodiments for multi-view applications, stereo disparity or stereo depth information may be used to build and initialize those relationships that can be used for rate control of the multi-view codec. These relationships may take several forms: linear regression or least squares estimation could be used to provide functions that estimate bits from coding parameters of multiple layers, or estimate coding parameters of one given bits targets and coding parameters from the other layers. If content statistics are known (e.g. disparity for multi-view applications) then the relationships could be functions of those statistics whose parameters are further tuned using linear regression or least squares estimation, among a variety of optimization techniques. Inter-layer relationships can change depending on content: for example the compressibility of the EL with respect to the BL will be different for static content as compared to active (high motion) content. This is true for temporal scalability for example. For view scalability these relationships will depend on stereo disparity (which changes with time and scene type), among others.

In some embodiments of the disclosure, separate rate control models are maintained for each one of the layers of the multi-layer video coding system. However, rate control model initialization, its convergence and performance benefit from the use of inter-layer information about correlation and rate-distortion performance. After coding the base layer and updating the base layer rate control model, this information can be used to update the rate control model for the enhancement layer even before that layer is coded for the given frame. This is possible given information about inter-layer correlation and translation relationships. Therefore, in some embodiments, translation relationships can be used to initialize and update modules even when modules are present for every layer. For example, after coding the BL some knowledge and possibly also some a priori inter-layer analysis information is available. These can be used to initialize the rate control model for the EL prior to coding any EL frame. The same can occur with coding frames other than the first. Correlation across layers can be used to update each model: by way of example, due to scene changes, the knowledge from coding the BL may function as a "lookahead" type of information.

Similarly, after coding an enhancement layer the derived coding statistics do not only update the enhancement layer rate control model but may also be useful in updating the base layer or other dependent enhancement layer rate control models. Last, the same is also true for rate control model initialization. Rate control model performance also benefits since the model converges thus faster. Reference can also be made to the techniques of U.S. Provisional Patent Application No. 60/976,381, incorporated herein by reference in its entirety, where the techniques directed to the slices of that application can be applied to the various layers of the present application.

In one embodiment, these translation relationships (and inter-layer information to be used in the translation relationships) are adaptively calculated and updated based on image sequence statistics. This may be performed both in single-pass coding, by only using causal statistics, and in multiple-pass coding, by using statistics from the previous pass in addition to causal statistics from the current pass. Note that multiple-pass coding may adopt the architecture described in a subsequent embodiment, where the first pass may disregard the enhancement layers, while the intermediate passes may selectively consider them in order to derive these relationships. For multi-view or stereoscopic 3D video coding embodiments the translation relationships may also be modeled with the help of stereo disparity or depth information.

Figure 7:
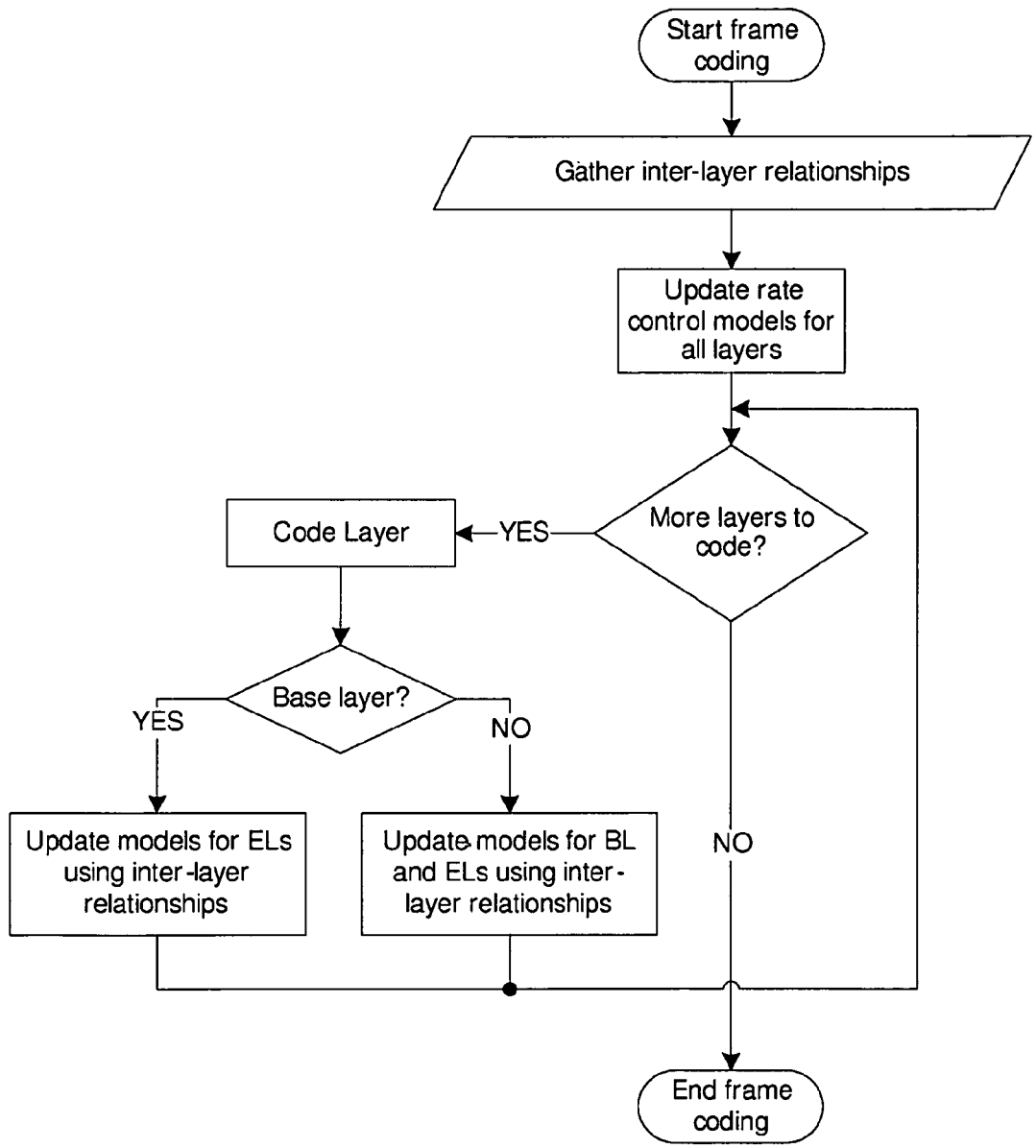
FIG. 7 shows a more detailed flow chart where rate control with inter-layer considerations is performed.

In the method depicted in FIG. 7, the models for EL are updated when coding the base layer and the models for both the BL and EL are updated when coding an enhancement layer using inter-layer relationships.

As already noted above, according to a further embodiment of the disclosure, similar to what shown in U.S. Provisional Patent Application No. 61/061,941, it is possible that fewer models M are required than the total number of layers L. Similarly to the method above the models may also be updated using inter-layer information and translation relationships. In addition, for the layers that are not modeled with a rate control model, the translation relationships may be used to derive either bit estimates or coding parameters for the given bit targets and selected coding parameters for the rest of the layers.

In accordance with yet another embodiment of the disclosure, a joint rate control model is maintained for all layers of the multi-layer video coding system. In one embodiment, the rate control model is adaptively updated based on region, picture, group of pictures, and/or image sequence statistics. This may be performed both in single-pass coding, by only using causal statistics, and in multiple-pass coding, by using statistics from the previous pass in addition to causal statistics from the current pass. Similarly to what mentioned before, for multi-view or stereoscopic 3D video coding embodiments the model may also be updated with the help of stereo disparity or depth information. Segmentation accompanied with motion/stereo disparity analysis can also be used to estimate the correlation across the views. Such information may be obtained through some previous coding pass or through some pre-analysis stage.

In a different embodiment, these translation relationships may be fixed or pre-determined: for example one may wish to fix the relationships of the coding parameters. In one such embodiment one may wish to fix the difference of the QP used to code the current enhancement layer with respect to the QP that codes the base layer of the same frame.

Figure 3:
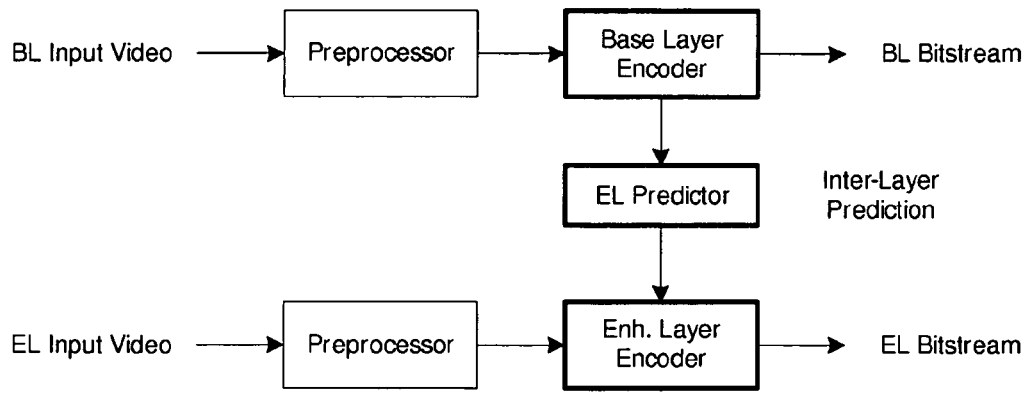
FIG. 3 shows a generic multi-layer video coding system.

For embodiments that deal with applications such as the system shown in FIG. 1 and FIG. 3, where each layer corresponds to a single view, the QP offset may be set close to zero, to ensure consistent video quality across both views. This setting is not restricted only to the QP, but can be extended to other coding parameters that control the rate usage and video quality, such as the Lagrangian multiplier, the transform coefficient thresholding strategy, among others.

Figure 2:
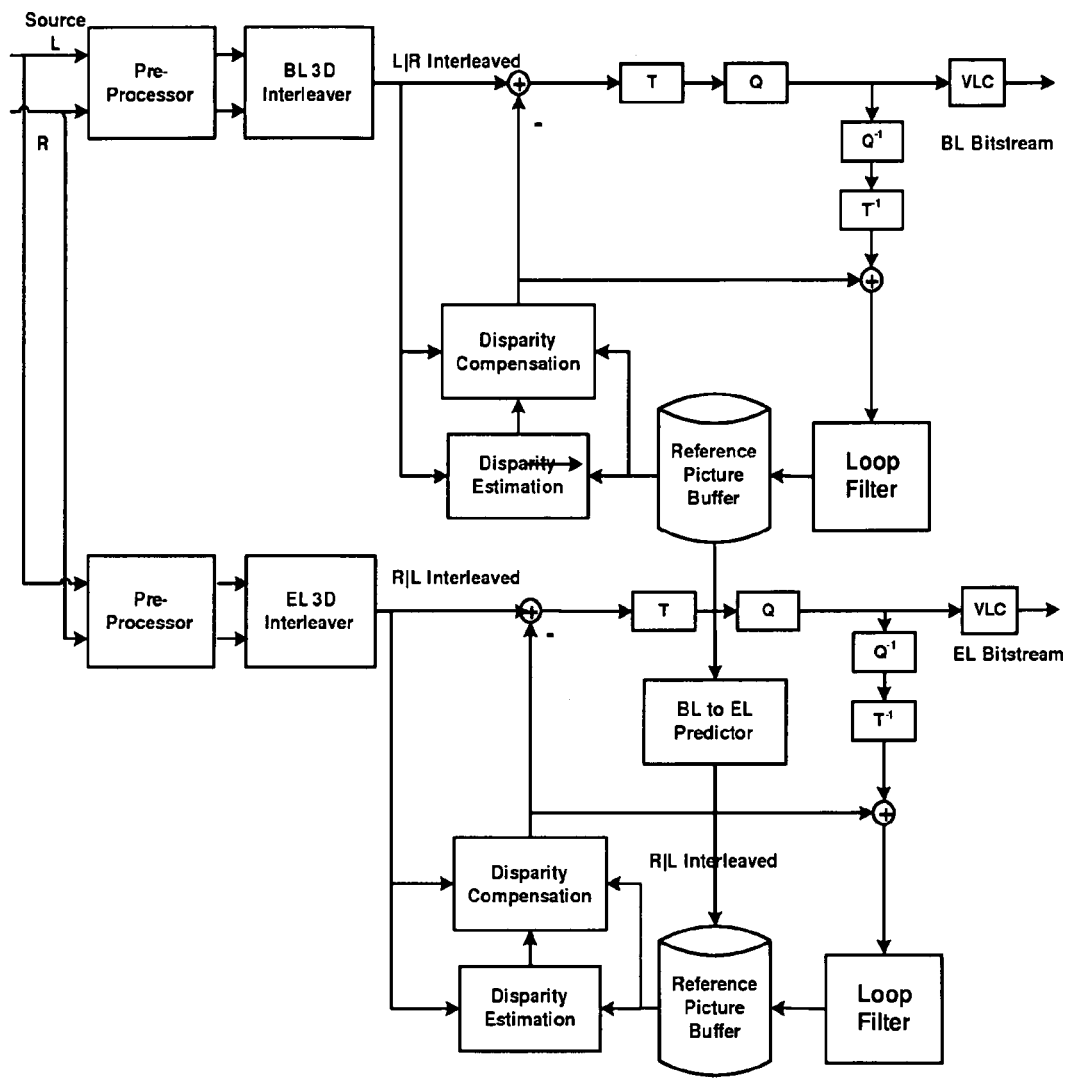
FIG. 2 shows a 3D stereoscopic scalable video coding system.
Figure 4:
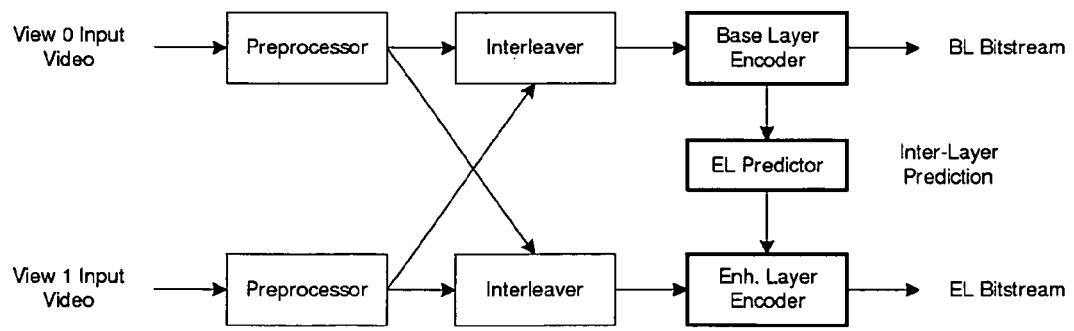
FIG. 4 shows a multi-layer video coding system where each layer multiplexes more than one view.

For embodiments that concern applications such as the one in FIG. 2 and FIG. 4, where each layer may contain samples from multiple or all of the views, the relationships may be relaxed and the QP (or other parameter) offsets may be increased (equivalently the quality delta may increase) compared to applications where each layer corresponds to a single view. The reason is spatial and stereo masking, which reduces the visual impact of coding artifacts.

In an additional embodiment, the QP (or other parameter) offsets may be estimated as a result of some pre-analysis stage that may examine stereo disparity, stereo depth, spatial correlation (e.g. the presence of texture or not), among others. Hence the translation relationships may be conditioned on the image sequence statistics. It should be noted that there are cases where large QP offsets are useful when each layer corresponds to each view: the QP is varied on a region level and for one layer region A is coded better than region B, while the opposite happens for the other layer. Such a technique exploits stereo masking.

In a different case, if there is evidence (through e.g. pre-analysis) that the sequence has low frequency characteristics and is, in general, smooth then the QP (or other parameter) offsets may be larger compared to cases where the image sequence has edges (or textured objects, among others) that are visually significant and need to be preserved. High-frequency content may require smaller QP offsets but this may not be true in the cases of high spatial masking (e.g. scenes with grass or trees) where the quality inconsistency will hardly be visible. Note though that the QP offsets may be further conditioned on the base QPs or the target bit rate. In general the finer the quantization (or the higher the target bit rate) the larger the QP offsets can be. The QP offsets may also be further conditioned on the color component and the color space. For example different considerations have to be taken when coding color information in the YUV domain and when coding information in the RGB or other domain. In general such QP offsets for the U and V components may be higher compared to the Y component since the Y component already contains part of the color information.

EXAMPLE 1

Figure 8:
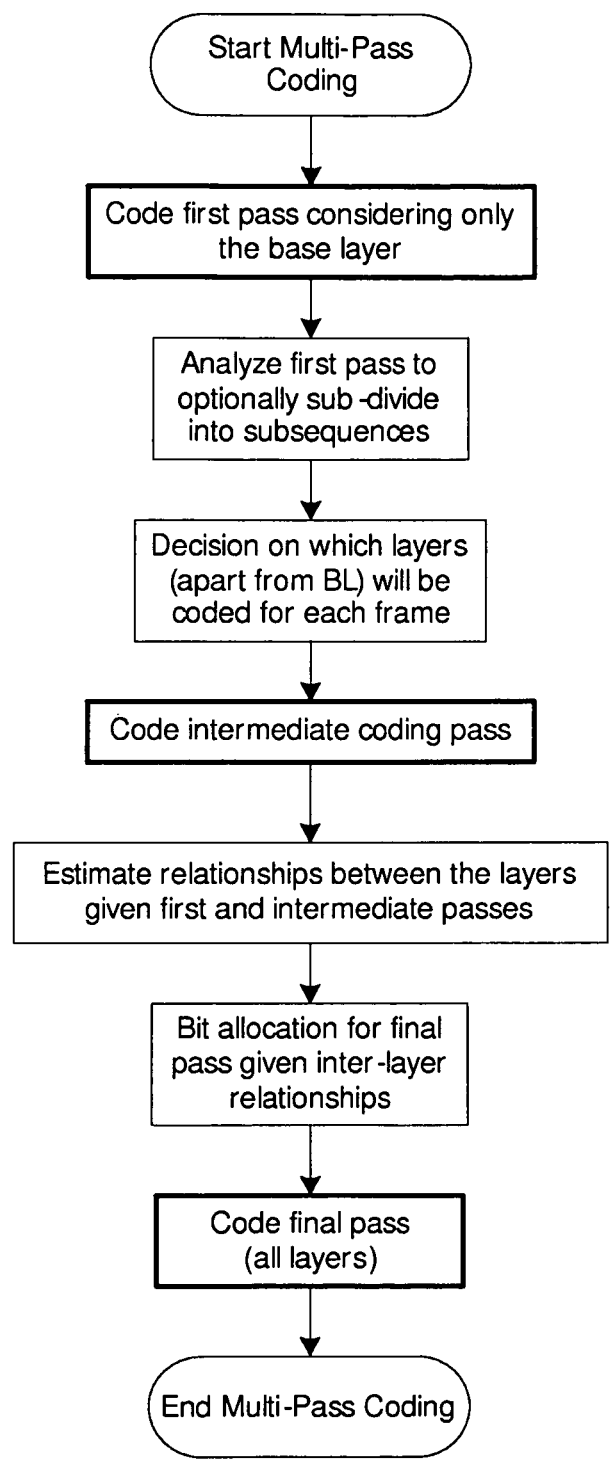
FIG. 8 shows a multiple-pass rate control algorithm for rate control with inter-layer considerations.

An example where multiple-pass rate control for multi-layer video coding applications is performed will now be described with reference to the flowchart shown in FIG. 8.

A first coding pass is performed that only considers the base layer. Coding statistics are gathered from each coded frame. A pre-analysis stage may also precede this pass to provide information that will help with selecting coding parameters and prediction structure(s) for this pass. This first coding pass (or passes) may be of lower complexity compared to the final coding pass. Subsequent passes may have to account for this discrepancy using techniques such as those outlined in U.S. Provisional Application Ser. No. 61,292,700.

Subsequent coding passes are designed to account first for the complexity discrepancy as outlined in U.S. Provisional Application Ser. No. 61,292,700. These so-called intermediate passes may use temporal or spatial sub-sampling as well as specially crafted prediction structures. Given information from the first pass, one may also subdivide the image sequence into subsequences and allocate different coding parameters. In the multi-layer application in accordance with the present disclosure, specific care is also taken to retrieve information on inter-layer correlation and statistics. In one embodiment, the intermediate passes now also consider the enhancement layer (or layers) as opposed to the first coding pass of this algorithm where only the base layer was considered. Note that not all enhancement layers need to be coded for each frame coded in these intermediate coding passes. As shown in U.S. Provisional Application Ser. No. 61,292,700, depending on the prediction structure that is adopted for these passes, one frame may be coded multiple times. The enhancement layer for a given frame could only be coded once since inter-layer information is not particularly dependent on the prediction structure or the coding parameters (e.g. QP). Note though that for temporal scalability, where the enhancement layer is a temporal layer, the prediction structure will affect the inter-layer information. Alternatively, some kind of temporal sub-sampling that may also be conditioned on sequence statistics (retrievable from the first coding pass) may be used to selectively enable or disable the coding of the enhancement layers in these intermediate passes. Coding statistics are gathered for each coded frame and groups of frames.

Prior to performing the final full complexity coding pass that considers all layers, a rate control module considers all the data gathered during the first (possibly low complexity) coding pass that considers only the base layer, and the subsequent intermediate coding passes. The rate control module derives complexity and possibly even coding parameter (e.g. QP) relationships by applying the methods outlined in the related application. In addition, the rate control module is also responsible for deriving relationships that describe correlation and statistics across the different coding layers. These relationships are then used to drive rate control decisions for the final coding pass. These relationships possibly include bit rate relationships for given coding parameters that may be conditioned on multiple layers (such as those useful to a joint rate control model). They also include coding parameter relationships that result to the same bit rate usage that may also be conditioned on a number of parameters from multiple layers.

EXAMPLE 2

A further example will now be described, where multiple-pass rate control based on a fixed QP offset constraint for one or more of the enhancement layers is performed.

A first coding pass is performed where the enhancement layer adopts a fixed QP offset with respect to the base layer QPs. The base layer QPs are either fixed or a simple rate control algorithm is used that adjusts the base layer QPs (the EL QPs are obtained as functions of those using the pre-defined QP offset) so that the total base and enhancement layer bit rate approach the bit rate target. Coding statistics are gathered for all layers.

If the first coding pass is of low complexity, intermediate coding passes as those described in the above mentioned related application are used to improve the statistics gathered during the first coding passes. In one embodiment, since in practice the statistics among different layers will be fairly similar, the intermediate coding passes consider only the base layer, to further constrain computational and memory complexity.

In the final coding pass, given the fixed QP offset constraint, the QP and bit allocation is selected so that the overall base and enhancement layer bit target is satisfied. Statistics from both layers are used to allocate bits and QPs.

EXAMPLE 3

An additional example that performs multiple-pass rate control based on a QP offset constraint for the enhancement layer that is modulated with respect to the base layer will now be described. The QP offset does not have to be identical for all base layer QP values. Instead, it may vary based on the value of the base layer QP. In general, the offset may be higher with lower QP values and vice versa. Thus, the offset can be obtained as $QP_{EL}=QP_{BL}+QP_{offset}=QP_{BL}+f(QP_{BL})$. In one example embodiment, $f(QP)$ may be set equal to 3 for $1 \leq QP \leq 20$, equal to 2 for $21 \leq QP \leq 35$, and equal to 1 for $36 \leq QP \leq 51$.

A first coding pass is performed that considers only the base layer. The base layer QPs are either fixed or are modulated. Coding statistics are gathered for all frames. This step is similar to the equivalent step in example 2 above.

This step involves intermediate coding passes and is similar to the second step of example 2 above. However, it adopts the following modifications: the BL modulated QP offset constraint is adopted when (optionally) coding the enhancement layers. Statistics are then gathered for each coded frame or group of frames.

Prior to the final coding pass, bit rate, complexity and inter-layer relationships are derived as in the last step of example 2. During the final coding pass, given the BL modulated QP offset constraint, the QP and bit allocation is selected so that the overall base and enhancement layer(s) bit target is satisfied. Statistics from all layers are used to allocate bits and QPs.

In practice, apart from the overall base and enhancement layer bit rate target, one may also wish to constrain the ratio of bits allocated to each layer. For example, one may wish to constrain the ratio to a maximum value of say 10%. This constraint may be enforced on a sequence level or even a frame level. While this may not often be realistic for applications where each layer corresponds to a different view, it may be possible for applications where multiple or all views are multiplexed into each layer, since spatial and stereo masking can account for the loss in visual quality. According to one embodiment, joint rate control of both layers can be considered where the base layer bit allocation is adjusted so that the enhancement layer bit rate ratio constraint is properly satisfied and subjective and/or objective quality is maintained and improved. In such an embodiment, the base layer bit rate would depend both on the bit budget remainder as well as on some estimate of the number of the bits that the enhancement layer would require. Rate control of the enhancement layer then considers the bit rate constraint for that layer given the number of bits already used for each layer. This estimate may be derived using inter-layer translation relationships as discussed previously. The base layer bit rate is also adjusted by further considering the impact on quality, not only on the base layer but also on the enhancement layer, since the quality of the enhancement layer is affected by the base layer. In one embodiment, a single rate control model is maintained for the base layer and it is then translated to that of the enhancement, layer using optionally methods outlined in US Provisional Patent Application No. 61/061,941, while in another embodiment separate rate control models are maintained for each layer.

EXAMPLE 4

Figure 9:
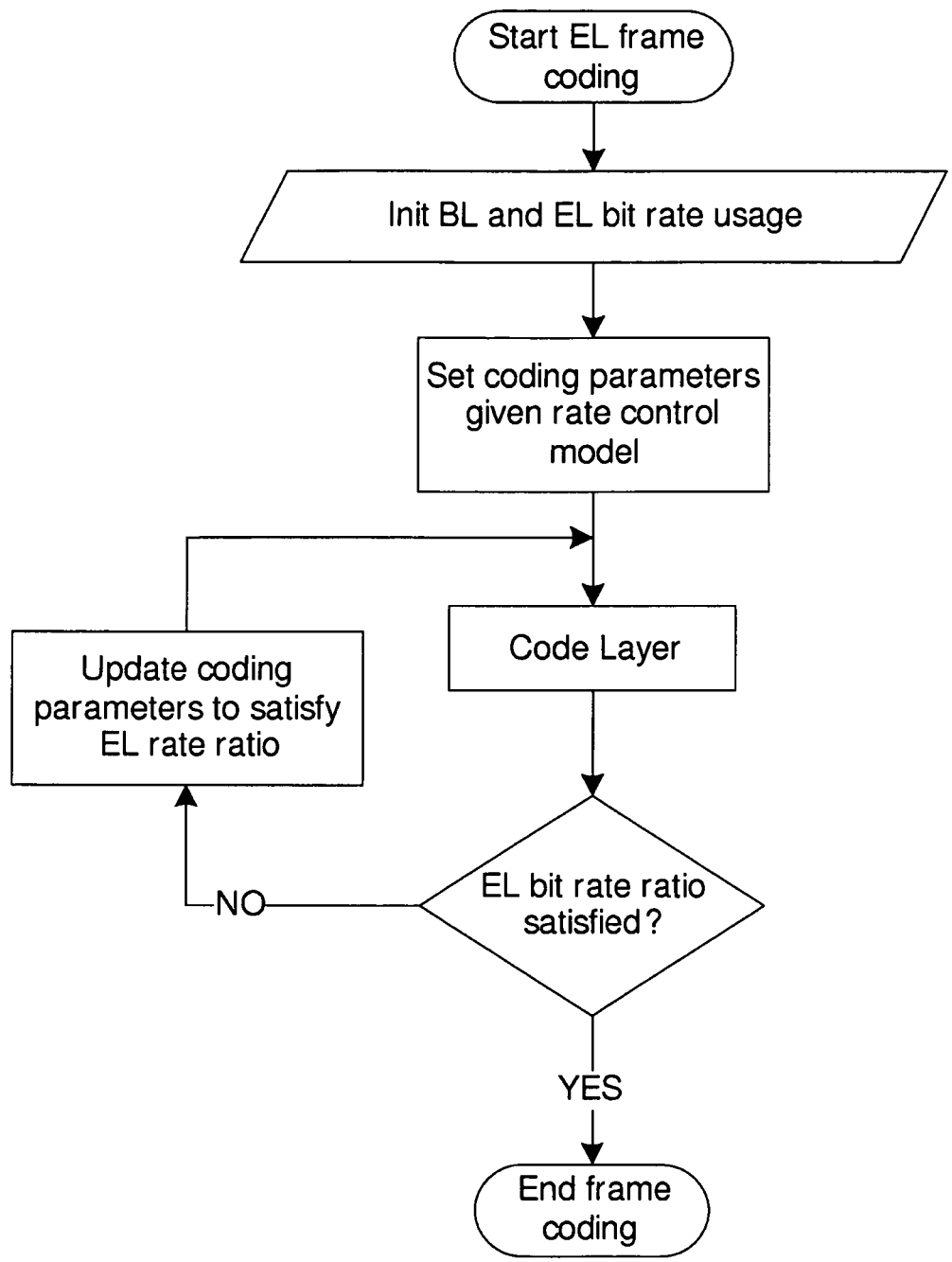
FIG. 9 shows a method for single-pass rate control with maximum enhancement layer (EL) bit rate ratio considerations.

An example for single-pass rate control is now described. For each frame coded in the base layer, the rate control for the enhancement layer chooses coding parameters (e.g. QP) that will help maintain the bit rate ratio constraint. If the rate control selection exceeds the ratio constraint then the enhancement layer may be recoded to ensure the constraint is met. A flowchart is illustrated in FIG. 9, where updating of the coding parameters to satisfy the EL bit rate ratio is shown.

EXAMPLE 5

An example for multiple-pass rate control is now described. Since information from the entire sequence and all layers or views is available, it is possible to find a fixed QP offset for the QPs of the enhancement layer respective to QPs of the base layer of the same collection of layers or views that will satisfy the maximum ratio constraint. Doing so will ensure consistent video quality and avoid temporal fluctuations of quality across the layers. In other words, the quality delta will appear approximately constant. The first two steps are identical as those of examples 2 and 3 described above. The third stage is modified in addition as follows:

In the final coding pass, the rate control method loops through a set of possible fixed QP offset constraints. For each QP constraint, the QP and bit allocation is selected so that the overall base and enhancement layer bit target is satisfied. The fixed QP constraint, which also satisfies the base/enhancement layer bit rate ratio is selected to code the entire multi-layer/multi-view sequence. Statistics from both layers are used to allocate bits and QPs.

EXAMPLE 6

In this example, the initial coding passes for all multi-pass embodiments described above may also be replaced or enhanced by some pre-processor analysis passes that do not produce any compressed bitstreams but they instead produce statistics that can be useful to a rate control algorithm. The rate control analysis modules could still translate those statistics into coding statistics with the help of appropriate intermediate coding passes.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the high performance rate control for multi-layered video coding applications of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] Advanced video coding for generic audiovisual services, http://www.itu.int/rec/recommendation.asp?type=folders&lang=e&parent=T-REC-H.264, October 2009.

The invention claimed is:

1. A multi-layer video encoding system, comprising:
   a base layer encoder to provide a base layer encoded bitstream of a video input;
   one or more enhancement layer encoders to provide corresponding one or more enhancement layer encoded bitstreams of the video input;
   an inter-layer analysis module to gather and analyze coding statistics from one or more of the base layer encoder and one or more enhancement layer encoders, provide one or more rate control models, and update the one or more provided rate control models based on the coding statistics, each rate control model being associated with the base layer encoder and/or the one or more enhancement layer encoders; and
   at least one rate control module to perform rate control on one or more of the base layer encoder and one or more enhancement layer encoders based on the inter-layer analysis module, the at least one rate control module to provide one or more rate control models, each rate control model being associated with base layer encoding by the base layer encoder and/or enhancement layer encoding by the one or more enhancement layer encoders;
   wherein:
   rate control models among the one or more rate control models associated with the enhancement layer encoding are updated during the base layer encoding using inter-layer relationships; and
   each of the one or more rate control models is updated during the enhancement layer encoding using inter-layer relationships.

2. The system as recited in claim 1, further comprising a preanalysis module, wherein the coding statistics analyzed by the inter-layer analysis module also depends on the preanalysis module.

3. The system as recited in claim 1, wherein rate control of a layer is based on coding statistics for that layer.

4. The system as recited in claim 1, wherein rate control of a layer is based on coding statistics for that layer and other layers.

5. The system as recited in claim 1, wherein the number of rate control modules, is lower, same or higher than the number of layers.

6. The system as recited in claim 1, wherein the rate control modules are updated based on inter-layer relationships.

7. The system as recited in claim 6, wherein the inter-layer relationships are adaptively computed.

8. The system as recited in claim 7, wherein adaptive computation is performed in a single-pass or multiple-pass coding.

9. The system as recited in claim 1, wherein coding statistics gathered for one layer are used in a rate control module for that layer.

10. The system as recited in claim 9, wherein the coding statistics are gathered in single pass coding or multiple pass coding.

11. The system as recited in claim 1, wherein coding statistics gathered for one layer are also used in a rate control module for a different layer.

12. A method for encoding a video signal, the method comprising:
    providing one or more rate control models, each rate control model being associated with base layer encoding and/or enhancement layer encoding, wherein at least one of the one or more rate control models is associated with the base layer encoding and at least one of the one or more rate control models is associated with the enhancement layer encoding;
    base layer encoding the video signal to provide a base layer encoded bitstream;
    enhancement layer encoding the video signal to provide one or more enhancement layer encoded bitstreams;
    gathering and analyzing coding statistics from the base layer encoding and/or enhancement layer encoding to provide inter-layer relationships;
    updating the one or more provided rate control models based on the inter-layer relationships; and
    performing rate control on the base layer encoding and enhancement layer encoding based on the inter-layer relationships and the one or more updated rate control models,
    wherein:
    rate control models among the one or more rate control models associated with the enhancement layer encoding are updated during the base layer encoding using inter-layer relationships; and
    each of the one or more rate control models is updated during the enhancement layer encoding using inter-layer relationships.

13. The method as recited in claim 12, wherein analyzing the coding statistics is also based on pre-analysis of the video signal.

14. The method as recited in claim 12, wherein performing rate control on a layer is based on coding statistics for that layer.

15. The method as recited in claim 12, wherein performing rate control on a layer is based on coding statistics for that layer and other layers.

16. The method as recited in claim 12, wherein the enhancement layer encoding comprises:
coding each enhancement layer among one or more enhancement layers with coding parameters that are selected to obtain a desired bit rate ratio constraint;
if the desired bit rate ratio constraint is not obtained, updating the coding parameters; and
coding again the one or more enhancement layers until the desired bit rate ratio constraint is obtained.

17. The method as recited in claim 12, wherein:
the one or more rate control models comprise a first set of rate control models and a second set of rate control models,
the first set of rate control models being associated with the base layer encoding, and the second set of rate control models being associated with the enhancement layer encoding and based on the first set of rate control models.

18. The method as recited in claim 12, wherein the one or more provided rate control models comprises at least a base layer rate control model and an enhancement layer rate control model, the method further comprising, subsequent to the base layer encoding and prior to the enhancement layer encoding:
updating the base layer rate control model based on the base layer encoding; and updating the enhancement layer rate control model based on the updated base layer rate control model, wherein the enhancement layer encoding is based on the updated enhancement layer rate control model.

19. A multiple-pass rate control method for multi-layer video coding applications that comprise a base layer and one or more enhancement layers, the method comprising:
providing one or more rate control models, each rate control model being associated with the base layer and/or the one or more enhancement layers;
performing a first coding pass on the base layer;
gathering coding statistics of the first coding pass;
performing intermediate coding passes on the base layer and one or more enhancement layers;
gathering coding statistics of the intermediate coding passes;
estimating relationships between the layers based on the first coding pass and the intermediate coding passes;
updating the one or more provided rate control models based on the first coding pass and the intermediate coding passes; and
performing a final coding pass based on the gathered coding statistics, the estimated relationships, and the one or more updated rate control models,
wherein:
rate control models among the one or more rate control models associated with coding passes of the one or more enhancement layers are updated using inter-layer relationships during coding passes on the base layer; and
each of the one or more rate control models is updated using inter-layer relationships during the coding passes of the one or more enhancement layers.

20. The method as recited in claim 19, wherein coding parameters for the first coding pass are selected from a pre-analysis stage.

21. The method as recited in claim 19, wherein the intermediate coding passes use one or more of spatial or temporal subsampling.

22. The method as recited in claim 19, wherein the intermediate coding passes use coding parameters that are allocated in function of specific sequences of video information.

23. The method as recited in claim 19, wherein the first coding pass is replaced or enhanced by pre-processor analysis.

24. The method as recited in claim 19, wherein the first coding pass on the base layer is performed with lower complexity than the final coding pass.

25. The method as recited in claim 19, wherein:
when coding is performed on an enhancement layer, quantization parameters used for the base layer are at an offset from the quantization parameters of the enhancement layer, and
the performing a final coding pass is based on the gathered coding statistics and the estimated relationships to satisfy target bit rate and fixed quantization parameter constraints.

26. The method as recited in claim 25, wherein the offset varies as a function of the value of the quantization parameters for the base layer.

27. The method as recited in claim 25 wherein the first coding pass is replaced or enhanced by pre-processor analysis.

28. A multiple-pass rate control method for multi-layer video coding applications that comprise a base layer and one or more enhancement layers, the method comprising:
providing one or more rate control models, each rate control model being associated with the base layer and/or the one or more enhancement layers;
performing a first coding pass on the base layer and the one or more enhancement layers, wherein quantization parameters used for the base layer are at a fixed offset from the quantization parameters of each of the one or more enhancement layers;
gathering coding statistics for the base layer and the one or more enhancement layers;
performing intermediate coding passes on the base layer and one or more enhancement layers;
gathering coding statistics of the intermediate coding passes;
updating the one or more provided rate control models based on the first coding pass and the intermediate coding passes; and
performing a final coding pass based on the gathered coding statistics to satisfy target bit rate, fixed quantization parameter constraints, and the one or more updated rate control models,
wherein:
rate control models among the one or more rate control models associated with coding passes of the one or more enhancement layers are updated using inter-layer relationships during coding passes on the base layer; and
each of the one or more rate control models is updated using inter-layer relationships during the coding passes of the one or more enhancement layers.

29. The method as recited in claim 28, wherein the first coding pass is replaced or enhanced by pre-processor analysis.

30. The method as recited in claim 28, wherein, in the final coding pass, quantization parameters and bit allocation for each quantization parameter constraint are selected so that a fixed offset constraint and an overall base and enhancement layer bit target are satisfied.

31. The method as recited in claim 28, wherein the first coding pass is replaced or enhanced by pre-processor analysis.

32. A non-transitory computer-readable storage media that comprises a set of instructions stored therewith which, when executed by one or more computing or processing devices, causes performance of a process for encoding a video signal, the process comprising the steps of:

provide one or more rate control models, each rate control model being associated with base layer encoding and/or enhancement layer encoding, wherein at least one of the one or more rate control models is associated with the base layer encoding and at least one of the one or more rate control models is associated with the enhancement layer encoding;

base layer encoding the video signal to provide a base layer encoded bitstream;

enhancement layer encoding the video signal to provide one or more enhancement layer encoded bitstreams;

gathering and analyzing coding statistics from the base layer encoding and/or enhancement layer encoding to provide inter-layer relationships;

updating the one or more provided rate control models based on the inter-layer relationships; and performing rate control on the base layer encoding and enhancement layer encoding based on the inter-layer relationships and the one or more updated rate control models, wherein:

rate control models among the one or more rate control models associated with the enhancement layer encoding are updated during the base layer encoding using inter-layer relationships; and each of the one or more rate control models is updated during the enhancement layer encoding using inter-layer relationships.

33. A non-transitory computer-readable storage media that comprises a set of instructions stored therewith which, when executed by one or more computing or processing devices, causes performance of a multiple-pass rate control process for multi-layer video coding applications that comprise a base layer and one or more enhancement layers, the process comprising the steps of:

providing one or more rate control models, each rate control model being associated with the base layer and/or the one or more enhancement layers;

performing a first coding pass on the base layer;

gathering coding statistics of the first coding pass;

performing intermediate coding passes on the base layer and one or more enhancement layers;

gathering coding statistics of the intermediate coding passes;

estimating relationships between the layers based on the first coding pass and the intermediate coding passes;

updating the one or more provided rate control models based on the first coding pass and the intermediate coding passes; and performing a final coding pass based on the gathered coding statistics, the estimated relationships, and the one or more updated rate control models, wherein:

rate control models among the one or more rate control models associated with coding passes of the one or more enhancement layers are updated using inter-layer relationships during coding passes on the base layer; and each of the one or more rate control models is updated using inter-layer relationships during the coding passes of the one or more enhancement layers.

34. A non-transitory computer-readable storage media that comprises a set of instructions stored therewith which, when executed by one or more computing or processing devices, causes performance of a multiple-pass rate control process for multi-layer video coding applications that comprise a base layer and one or more enhancement layers, the process comprising the steps of:

providing one or more rate control models, each rate control model being associated with the base layer and/or the one or more enhancement layers;

performing a first coding pass on the base layer and the one or more enhancement layers, wherein quantization parameters used for the base layer are at a fixed offset from the quantization parameters of each of the one or more enhancement layers;

gathering coding statistics for the base layer and the one or more enhancement layers;

performing intermediate coding passes on the base layer and one or more enhancement layers;

gathering coding statistics of the intermediate coding passes;

updating the one or more provided rate control models based on the first coding pass and the intermediate coding passes; and performing a final coding pass based on the gathered coding statistics to satisfy target bit rate, fixed quantization parameter constraints, and the one or more updated rate control models, wherein:

rate control models among the one or more rate control models associated with coding passes of the one or more enhancement layers are updated using inter-layer relationships during coding passes on the base layer; and each of the one or more rate control models is updated using inter-layer relationships during the coding passes of the one or more enhancement layers.

35. A system for encoding a video signal, the system comprising:

means for providing one or more rate control models, each rate control model being associated with base layer encoding and/or enhancement layer encoding, wherein at least one of the one or more rate control models is associated with the base layer encoding and at least one of the one or more rate control models is associated with the enhancement layer encoding;

means for base layer encoding the video signal to provide a base layer encoded bitstream;

means for enhancement layer encoding the video signal to provide one or more enhancement layer encoded bitstreams;

means for gathering and analyzing coding statistics from the base layer encoding and/or enhancement layer encoding to provide inter-layer relationships;

means for updating the one or more provided rate control models based on the inter-layer relationships; and means for performing rate control on the base layer encoding and enhancement layer encoding based on the inter-layer relationships and the one or more updated rate control models, wherein:

rate control models among the one or more rate control models associated with the enhancement layer encoding are updated during the base layer encoding using inter-layer relationships; and each of the one or more rate control models is updated during the enhancement layer encoding using inter-layer relationships.

36. A multiple-pass rate control system for multi-layer video coding applications that comprise a base layer and one or more enhancement layers, the system comprising:

means for providing one or more rate control models, each rate control model being associated with the base layer and/or the one or more enhancement layers;
means for performing a first coding pass on the base layer;
means for gathering coding statistics of the first coding pass;
means for performing intermediate coding passes on the base layer and one or more enhancement layers;
means for gathering coding statistics of the intermediate coding passes;
means for estimating relationships between the layers based on the first coding pass and the intermediate coding passes;
means for updating the one or more provided rate control models based on the first coding pass and the intermediate coding passes; and
means for performing a final coding pass based on the gathered coding statistics, the estimated relationships, and the one or more updated rate control models,
wherein:
rate control models among the one or more rate control models associated with coding passes of the one or more enhancement layers are updated using inter-layer relationships during coding passes on the base layer; and
each of the one or more rate control models is updated using inter-layer relationships during the coding passes of the one or more enhancement layers.

37. A multiple-pass rate control system for multi-layer video coding applications that comprise a base layer and one or more enhancement layers, the system comprising:

means for providing one or more rate control models, each rate control model being associated with the base layer and/or the one or more enhancement layers;
means for performing a first coding pass on the base layer and the one or more enhancement layers, wherein quantization parameters used for the base layer are at a fixed offset from the quantization parameters of each of the one or more enhancement layers;
means for gathering coding statistics for the base layer and the one or more enhancement layers;
means for performing intermediate coding passes on the base layer and one or more enhancement layers;
means for gathering coding statistics of the intermediate coding passes;
means for updating the one or more provided rate control models based on the first coding pass and the intermediate coding passes; and
means for performing a final coding pass based on the gathered coding statistics to satisfy target bit rate, fixed quantization parameter constraints, and the one or more updated rate control models;
wherein:
rate control models among the one or more rate control models associated with coding passes of the one or more enhancement layers are updated using inter-layer relationships during coding passes on the base layer, and
each of the one or more rate control models is updated using inter-layer relationships during the coding passes of the one or more enhancement layers.

* * * * *